June 1, 1937.   R. T. FRIEBUS   2,082,488
MOTION PICTURE PROJECTING APPARATUS
Filed April 3, 1935
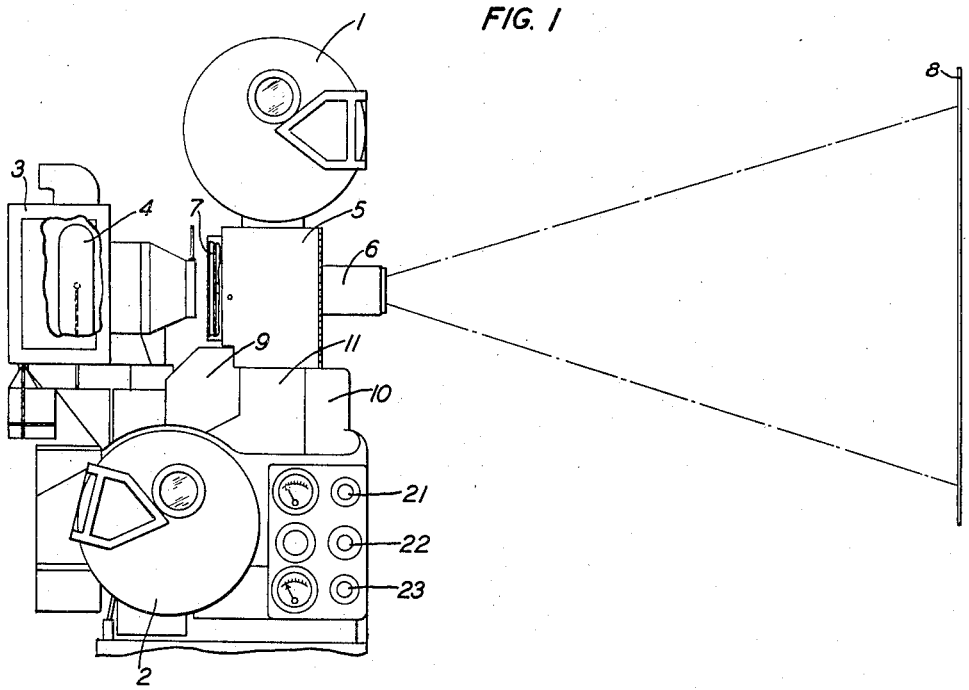
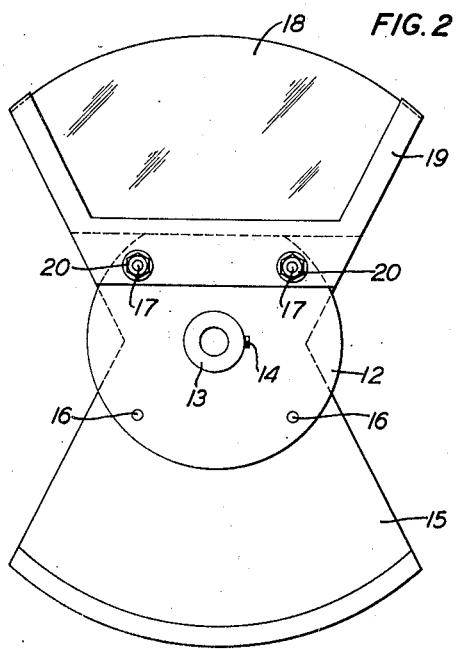
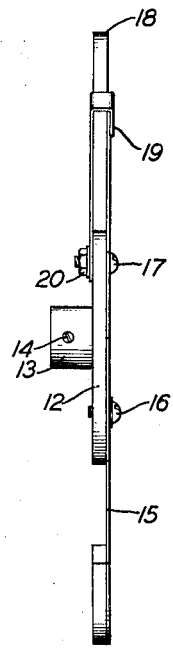
INVENTOR
R. T. FRIEBUS
BY
G. H. Heydt.
ATTORNEY Patented June 1, 1937

2,082,488

UNITED STATES PATENT OFFICE 2,082,488

MOTION PICTURE PROJECTING APPARATUS

Reginald T. Friebus, Montclair, N. J., assignor, by mesne assignments, to Western Electric Company Incorporated, a corporation of New York Application April 3, 1935, Serial No. 14,411

1 Claim. (Cl. 88—17)

This invention relates to motion picture projection and more particularly to a method of and means for improving the visual acuity of the picture image projected on a viewing screen.

Standard picture projectors as now employed have incorporated therein means for intermittently feeding a film past an exposure aperture and a shutter rotatable in front of this exposure aperture. The shutter usually employed in these machines has an opaque obscuring blade and an opaque intercepting blade. It is well known that the obscuring blade covers the aperture during the period of movement of the film and that the intercepting blade passes through the light beam during the period of projection of the picture to render the contrast between the dark and light periods less conspicuous. Many attempts have been made to provide a shutter for projection machines having an obscuring blade and an intercepting blade but which will allow more light to reach the screen to produce a brighter picture image on the screen. Most of these attempts have included the suggestion that the obscuring blade be made of a translucent material which will permit the passage of light but which is opaque to the projection of a picture image and an intercepting blade which is transpicuous to both light and picture projection. The material used for the obscuring blade in the suggested shutters usually takes the form of tinted glass having surface irregularities to prevent passage of a picture image, while the intercepting blade takes the form of a non-refracting glass tinted in a lighter shade.

None of the suggested shutters discussed above have proven of value for use in commercial picture projection machines to produce a flickerless picture image of greater brightness than the picture image projected by the present standard projecting machine.

It is the object of this invention to provide a motion picture projecting machine capable of projecting a picture of greater visual acuity than is now projected by existing projecting apparatus.

A further object of the invention is to provide a picture projecting means capable of projecting a light beam which will not only be brighter but in which the spectral balance will be more nearly that of a white light.

A feature of the invention lies in the provision of a shutter having an opaque obscuring blade and a colored translucent intercepting blade, the color of which is so chosen with respect to the spectral character of the light source that the contrast between the black and white portions of the projected picture will be greater.

In accordance with this invention there is provided in combination with a motion picture provided apparatus, a rotary shutter, the intercepting blade of which is made preferably of non-refracting glass impregnated with a coloring substance. Specifically, the invention as described in the following paragraphs relates to a motion picture apparatus employing a tungsten light as the source of illumination and a shutter having an opaque obscuring blade and a non-refracting translucent blue colored intercepting blade.

Although the following specification describes in particular a machine employing a tungsten light as the source of illumination, it is to be understood that the idea disclosed herein may be successfully applied to motion picture machines employing other known types of light sources for illumination of the film and viewing screen.

The invention may be more readily understood by reference to the specification read in connection with the accompanying drawing in which:

Fig. 1 shows a sound picture projecting apparatus and picture projection screen;

Fig. 2 shows a front view of a projector shutter constructed in accordance with the invention; and Fig. 3 is a side view of the shutter shown in Fig. 2.

As stated above, a motion picture projector shutter comprises an obscuring blade and an intercepting blade. The obscuring blade covers the aperture during the period of movement of the motion picture film and the intercepting blade passes through the light beam during the period of projection of the picture to render the contrast between the dark and light periods less conspicuous. It follows that the intercepting blade cuts down the amount of light admitted to the screen while each picture is being projected. As the intercepting blade is a necessary element of any projection shutter, it was thought by those skilled in the art that this loss in illumination must be suffered in order to produce flickerless projection of the picture image.

Applicant found that a brighter and clearer image of the picture projected to a viewing screen could be produced in picture projecting apparatus in a manner which would permit the use of shutters in substantially the same form used heretofore. Applicant's invention takes the form of a shutter having an opaque obscuring blade and an intercepting blade made of a non-refracting glass, the color of which depends on the light source used as the projection light. In other words, the intercepting blade in accordance with applicant's invention is given a color which, when used with the particular light source employed in the projection apparatus, will produce a projection light approximating the spectral balance of "white light" or a light having equal amounts of light of all wave-lengths in the visible spectrum.

It is to be understood that the improved picture projection provided by applicant's invention is not produced solely by an increase in the total light transmitted as it will be apparent from the following specification that the percentage increase in the total light is small. In applicant's invention a correct combination of light source and translucent intercepting blade color is provided so that the total transmitted light will not only be greater but the spectral balance of the light projected will approximate the spectral balance of "white light".

In Fig. 1 a sound picture projecting apparatus comprises a film feed reel 1, a film take-up reel 2, and a picture projecting apparatus including a projector lamp housing 3 in which is supported a tungsten projector lamp 4, a housing 5 containing suitable intermittent film driving mechanism, a lens tube 6 and a shutter 7. A screen 8 receives a picture image projected from the projecting apparatus. A sound reproducing unit includes an exciter lamp housing 9, a photoelectric cell housing 10 and a housing 11 containing a film driving sprocket and film gate mechanism.

Details of a shutter constructed in accordance with the invention are disclosed in Figs. 2 and 3. A supporting member 12 has a hub portion 13 which fits over a driven shaft (not shown) and is secured to this shaft by means of a set screw 14. The driven shaft to which the shutter supporting member 12 is secured is connected to the film driving mechanism of the projector in a suitable and well-known manner. A blade member 15 is secured to the member 12 by means of machine screws 16 and bolts 17. The lower section of member 15 comprises a solid section of opaque material to form the obscuring blade of the projector shutter. The upper section of the member 15 has a cut-out portion adapted to receive a member 18 of translucent material forming the intercepting blade of the projector shutter. The intercepting blade or translucent member 18 is clamped in position by means of clamping member 19 which is secured to the member 12 by means of bolts 17 and nuts 20.

The removable intercepting blade 18 is preferably made of glass impregnated with a substance giving it the desired color. In other constructions it may comprise a section of glass, the outside surfaces of which are coated with a translucent or transparent paint of the desired color.

The projecting machine shown in Fig. 1 is what may be termed a semi-portable sound picture projector and is provided with jacks 21, 22, and 23 by means of which electrical connections may be made from a source of power to the driving motor, projector lamp 4, exciting lamp and photoelectric cell of the sound picture projecting apparatus.

In the projection machine disclosed in the accompanying drawing, a tungsten lamp is employed as the projection light. A light beam produced by tungsten lamp has a spectral unbalance caused by an excess amount of yellow light or light in the wave-lengths included in the yellow portion of the spectrum. In the picture image projected to a screen by a tungsten light source, there appears a brownish tint in both the black and white portions of the projected image.

Applicant's invention as applied to the particular picture projection apparatus employing a tungsten light source takes the form of a shutter having an opaque obstructing blade and a blue-colored intercepting blade. The blue blade, which periodically passes in front of the projection light beam, absorbs light in the wave-lengths causing spectral unbalance, namely, yellow light, and thus accentuates light in the wave-lengths in which the light source is deficient, namely, blue light.

The particular color to be employed for the intercepting blade must be carefully chosen so that the clearest picture image may be projected without the introduction of flicker in the projected picture. In the particular machine described employing a tungsten light source, which is high in the production of light of wave-lengths in the yellow portion of the visible spectrum, it is reasonable to assume that the balancing color to be used as a filter in the intercepting blade should be blue. The following specific example illustrates clearly the steps followed by applicant in determining the correct color to be employed as a filter in the intercepting blade of a shutter employed on a projection machine having a tungsten lamp as a source of projection light.

A test was made with a group of filters ranging from light blue to blue. The more important filters of this group together with the percentage of the total light which they transmit are as follows:

| Filter | Percentage of total light transmitted |
| --- | --- |
| a. Light blue | 31 |
| b. Light blue (two filters superimposed) | 9 |
| c. Blue | 4 |

Both filters "a" and "b" were eliminated as unfit for use in the shutter intercepting blade due to the fact that a noticeable flicker appeared in the projected picture. Using an intercepting blade corresponding to the color of filter "c", the picture projected on the screen appeared to have greater visual acuity and a higher contrast between the light and dark portions thereof than pictures projected on the same screen by a projection machine employing the same light source and a standard shutter having an opaque intercepting blade. Also, no flicker appeared in the projected picture when the blue-colored intercepting blade was employed. A transmission measurement, using blue light alone, showed that filter "c" transmits approximately eighty-five per cent. of light in the wave-length in which it is effective. A specific feature of the invention lies in applicant's discovery that the ideal shutter for projecting a picture to a viewing screen with a machine employing a tungsten light source is one having an opaque obscuring blade and a blue-colored flicker blade capable of transmitting approximately four per cent. of the total light and approximately eighty-five per cent. of light in the wave-length in which it is effective.

It will be appreciated from the foregoing specification that the filter as used in the intercepting blade does not add an imposing percentage to the total illumination but that what it does add is so advantageously placed in the spectrum that there is a great improvement in the quality of the projected light, and consequently a greatly improved picture image.

Although applicant has disclosed his invention as applied to a projection machine employing a tungsten light source, it is to be understood that his invention is not to be limited to this specific disclosure as the invention as broadly disclosed herein may be employed to improve the visual acuity of a picture image projected to a screen by picture projecting machines employing any known type of light source.

Applicant's invention may be applied to projecting machines employing shutters of any known type, for example, a cylindrical shutter in which diametrically opposite sections of the cylinder are cut away to allow the projecting light beam to pass therethrough and certain other sections of the cylinder constitute the light intercepting means. Therefore, the term "blade" appearing in the accompanying claim is meant to define the light intercepting means of any known type projector shutter and is not limited to the light intercepting vanes of the flat rotary shutter disclosed in the drawing.

What is claimed is:

The combination, in a motion picture apparatus having a tungsten light source, of a shutter for said apparatus, said shutter comprising an opaque obscuring blade, and a blue-colored translucent intercepting blade capable of transmitting approximately eight-five per cent of light in the wave-length in which it is effective.

REGINALD T. FRIEBUS.